April 28, 1964 T. T. COLLINS, JR 3,131,237
GAS SCRUBBING APPARATUS
Filed Nov. 17, 1958 3 Sheets-Sheet 1

INVENTOR.
THERON T. COLLINS, JR.
BY
George H. Baldwin
ATTORNEY

April 28, 1964     T. T. COLLINS, JR     3,131,237
GAS SCRUBBING APPARATUS
Filed Nov. 17, 1958     3 Sheets-Sheet 2

INVENTOR.
THERON T. COLLINS, JR.
BY
George H. Baldwin
ATTORNEY

April 28, 1964     T. T. COLLINS, JR     3,131,237
GAS SCRUBBING APPARATUS

Filed Nov. 17, 1958     3 Sheets-Sheet 3

INVENTOR.
THERON T. COLLINS, JR
BY George H. Baldwin
ATTORNEY

United States Patent Office 3,131,237
Patented Apr. 28, 1964

3,131,237
GAS SCRUBBING APPARATUS
Theron T. Collins, Jr., Palatka, Fla.
(804 Cedar St., Manistee, Mich.)
Filed Nov. 17, 1958, Ser. No. 774,511
8 Claims. (Cl. 261—153)

This invention pertains to gas scrubbing apparatus.

The removal of dust particles and noxious fumes from gases discharged by industrial processes has long been a problem of considerable importance, and many types of treatment have been devised. Among the treatments which have proved effective in some circumstances has been the scrubbing of the gases by means of liquids sprayed into or otherwise brought into contact with the gases, and it is to this type of treatment that this invention pertains.

A general object of the invention is to provide an improved apparatus for gas scrubbing.

A specific object is to provide a simple apparatus for scrubbing gas, which can be readily constructed to handle large volumes of gas, and which will be trouble-free over long periods of use.

Another specific object of the invention is to obviate the difficulties which inhere in the use of liquid sprays in gas scrubbers.

An important object of the invention is to minimize wet-dry line build-up in a venturi or other orifice type scrubber.

It is an additional object of the invention to provide apparatus for scrubbing a gas with liquid which will provide increased heat transfer from the gas.

In accord with this invention, water, or other scrubbing liquid, is caused to flow down the walls of a vertical gas duct to an orifice or throat and out into the path of gases through the orifice, the gases having high velocity in an upward direction through the orifice and the water being thus projected into the high velocity gas stream. Some of the liquid thus flowing into the path of the gas is entrained and broken up in the gas and rises therewith in a gargling action. As the gas rises above the orifice or throat, it loses velocity and expands, further breaking up the liquid particles, and as the velocity becomes sufficiently low, the liquid falls out of the rising gas stream with a tendency to fall or to be thrown outwardly toward the walls of the duct. The liquid so released from the gases accordingly falls along the walls toward the throat or orifice adding to the supplied liquid and being again directed into the gas stream at the throat. The system is self-regulating in that excess liquid falls through the orifice or throat for final collection in a sump located below the throat and self-cleaning because of this flow of water through the throat. The liquid collecting in the sump is removed for recirculation, discard or such other uses as may be desired.

In accord with preferred embodiments of the invention, the liquid is supplied to the duct above the throat through a trough having an inner lip or edge over which the liquid spills onto the walls of the duct and having an outer edge outside of the duct. Debris which may be contained in the supplied liquid merely collects in the trough from which it may readily be removed from outside of the duct, and the supply system is thus substantially non-clogging and able to operate efficiently without frequent cleaning with water containing mud, trash, stones, calcium, carbonate slurry, sand, wood chips or other debris which would almost immediately clog a spray nozzle.

Another object of the invention is to provide apparatus for scrubbing gas with a viscous liquid. Specifically contemplated by this object is the provision of means for scrubbing a dry gas, which may have a dry bulb temperature of several hundred degrees but a relatively low wet bulb temperature, with a liquor, for example, which may have suitably low viscosity at or near the dry bulb temperature of the gas but which has a much higher viscosity, such as to make it very difficult to use and handle as a scrubbing liquid, at or near the wet bulb temperature of the gas.

The novel features which are believed to be characteristic of this invention are set forth with particularity in the appended claims. The invention itself, however, together with further objects and advantages thereof, may best be understood by reference to the following description taken in connection with the accompanying drawing, in which:

Figure 8:
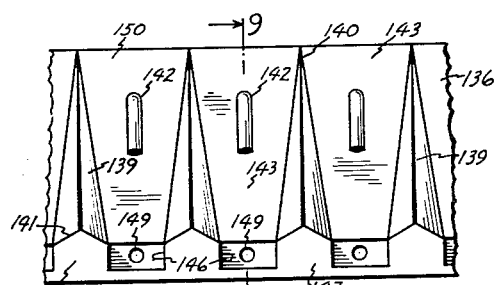
Figure 9:
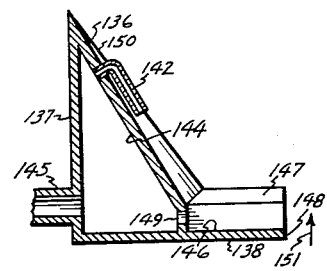

FIG. 8 is a fragmentary side elevation of a downwardly converging wall and orifice plate having channeled courses therealong, the wall and orifice plate being broken away from the rest of the parts of the scrubber, and illustrating the use of nozzles and orifices in conjunction with the channeled courses; and FIG. 9 is a cross sectional view of the wall and orifice plate taken along the line 9—9 of FIG. 8.

Figure 1:
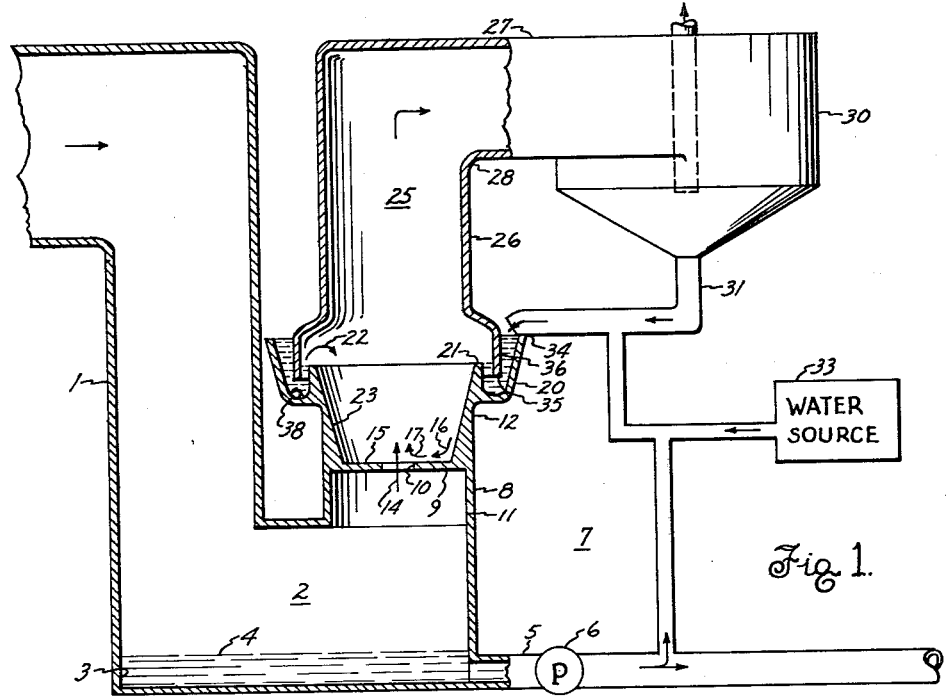
FIG. 1 is a partially schematic and partially sectionalized side elevation of a gas scrubber and major related elements of a gas scrubbing system.

The scrubber system of FIG. 1 includes a gas inlet duct or conduit 1 extending downwardly toward a sump chamber 2 having a liquid sump 3 at its bottom in which liquid 4 collects. A pipe 5 or the like permits removal of liquid from the sump. Suitable pumps, such as pump 6, may be provided in pipe 5 and at such other parts of the liquid transfer and supply system 7 as required, together with suitable valves (not shown), as is well known in liquid handling systems.

An upwardly extending gas duct or conduit 8 is joined to the sump chamber and through this duct the gas to be scrubbed rises. The lower portion 11 of duct or conduit 8 opens downwardly into sump 2 whereas the upper portion 12 of the duct 8 communicates with cyclone separator 30 by means of header 27. An orifice plate 9, having an orifice 10 in the center thereof, provides a throat within duct 8. Orifice 10 constitutes the sole gas and liquid passage between the lower portion 11 of the duct and the upper portion 12 thereof. Downwardly and inwardly extending walls 23 are provided at the lower end of the upper duct portion 12 to deflect the water which collects on the upper duct walls 26, as well as the water which is fed to the duct through the duct walls by means of trough 20, toward the throat or orifice 10 and into the gas stream, indicated by arrow 14, which rises therethrough. The converging walls 23 and that portion 15 of orifice plate 9 which lies inwardly of the lower extremity of converging walls 23, and which forms an inwardly projecting extension of the converging walls, function to deflect the scrubbing liquid into orifice 10, the water passing, as shown by arrows 16 and 17, downwardly and inwardly over the generally upwardly facing surfaces of converging walls. An excess volume of water, or other liquid, is supplied, thereby to cause some part thereof to pass downwardly through the throat 10 and to fall into and collect in sump 3. The passage of excess liquid downwardly through the throat tends to wash away any collection of solid materials which might otherwise form near the throat and provides an action in the throat which is very similar to the action of gargling in the human throat and which is, accordingly, herein referred to as a gargling action.

The gases to be scrubbed are usually hot and laden with dust or other small solid particles. These dust particles may be wetted or dampened upon meeting a wet portion of the walls of the scrubber, and just at the beginning of the wet portion of the wall, the dust particles tend to adhere upon becoming wet, and then to be dried by the gas stream, whereupon a small area of turbulence is created which causes additional dust particles to be deposited. These particles build up, being partially wetted by the liquid on the wet wall and partially dried by the gases. This area of build-up is called the wet-dry line, and it will be seen that the build-up at this line changes the proportions of the gas passageway. The greater the build-up becomes, the faster additional particles tend to deposit, until the scrubbing action is seriously impeded or until the duct becomes so choked off as not to permit sufficient gas to flow through the scrubber. It then becomes necessary to shut down and manually to remove the build-up from the inside walls or throat of the duct.

The continued counter-current flow of liquid in the arrangements in accord with this invention effectively prevent the formation of a wet dry line build-up. A gargling action occurs at the throat with substantial volumes of water washing through the throat, first at one part and then at another, flushing off any few particles which may be clinging near the throat.

The supply of water, or other scrubbing liquid, in the embodiment illustrated in FIG. 1 is delievered through a trough 20 having an inner edge 21 over which the entering liquid spills, as shown by arrow 22, to run downwardly and inwardly along the duct walls 23 and 15 toward the orifice 10. Some of this liquid which flows out into the orifice area is caught up by the gas stream and carried in the form of small droplets into the upper regions of the duct above the throat or orifice, such regions being generally indicated at 25. Most of such droplets fall out of the gas toward the upper duct walls 26 and toward walls 23, at the lower end of the upper duct portion. Some may drop out onto wall portion 15 of the orifice plate 9, but some may remain entrained in the gas and be removed through header duct 27, which is joined to the upper end 28 of the upper duct walls 26. The gases, may, accordingly, be supplied from header 27 into a cyclone separator 30, and the therein extracted liquid may be returned by pipe 31 into trough 20 or may be simply discarded as desired.

The liquid, such as water, supplied to the scrubber may be furnished from any desired source 33 and this liquid, to which may be added some or nearly all of the liquid from sump 3 and from cyclone 30, flows over the outer edge 34 into trough 20, there to pass under the lower edge 35 of the upper duct wall and up inside the portion 36 of the upper duct wall which is disposed within the trough and finally over the inner trough edge 21.

Inlet 1 will be understood to comprise some means, such as a blower, to force the gases through the scrubber. The pressure of the gas in region 25 of the duct may be, therefore, somewhat greater than atmospheric pressure. The outer edge 34 of the trough should be higher than the inner edge 21 by a distance sufficient to overcome by the head of the water externally of wall portion 36 the above-atmospheric pressure of the gas in region 25, whereby filling of the trough to a level somewhat below the outer edge 34 will be sufficient to cause the liquid to overflow the inner edge 21. The lower edge 35 of the duct wall should be below the level of the inner edge 21 whereby the duct is sealed against escape of gas throughout its length from chamber 2 to header 27.

The arrangement of FIG. 1, like the other arrangements shown and described herein, have the advantage of being non-clogging, and the liquid employed may carry large chunks of debris without creating difficulties. If a stone is carried into trough 20, for example, it will usually remain in the trough, such as at 38, and it may be readily removed by hand. If a stone or other piece of debris passes over edge 21, it will merely fall through orifice 10 into the large sump 3, where it may remain until a very large collection of debris may collect, an improbable occurrence since most stones and the like will collect in the trough. The trough is shown as being open at the top, both interiorly of the duct and exteriorly thereof. It is necessary that no interior cover be applied which would prevent the flow of liquid over lip 21, but it is immaterial to the functioning of the scrubber whether or not an exterior cover is provided for the trough outside of the duct walls 26. Any such cover should be removable to permit access to the trough for cleaning collected debris therefrom.

The duct 8 may be circular, i.e. cylindrical, with the trough 20 of generally annular shape and the orifice 10 circular, and such shape is preferred for smaller capacity scrubbers. For larger capacities, however, because it is not desirable to increase the distance across orifice 10 to a dimension such that water flowing toward the orifice, in the direction shown by arrow 16, will fail to reach the center of the orifice, it is preferred to form the orifice in the shape of an oval or rectangle. The trough shape in any case conforms to the shape of the duct whereby water overflowing edge 21 flows down the walls for projection out into the gas stream at the orifice or throat. The duct may be oval, rectangular or square in cross section as desired, without regard to the orifice shape, but it is preferred that, for a long and narrow rectangular or oval orifice, the duct be generally rectangular to conform approximately to the shape of the orifice.

Figure 2:
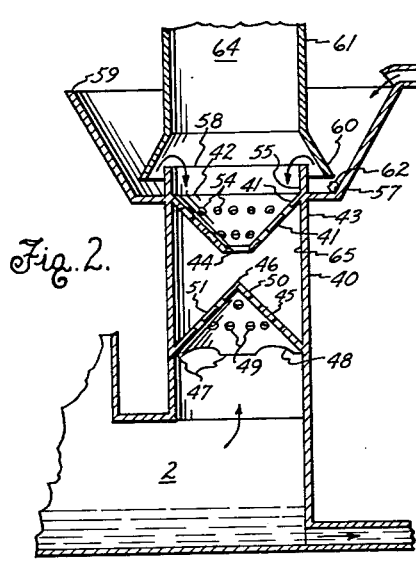
FIG. 2 is a partially sectionalized side elevation of a gas scrubber useful in a system generally in accord with that of FIG. 1, showing a modified construction of the scrubber.

The arrangement shown in FIG. 2 differs from that of FIG. 1 primarily in that a pair of conical or pyramidal orificed wall elements replace the orifice plate 9. Portions of the scrubber system, such as elements of the water supply, the header and the cyclone have been omitted in FIG. 2, and in FIGS 3 and 5, and it will be understood that such elements may be supplied in accord with the description and disclosure relating to FIG. 1.

As seen in FIG. 2, a cylindrical duct 40 rises vertically from sump chamber 2. Downwardly and inwardly extending deflecting walls 41 are attached at their upper and outer edges 42 to the duct wall 43 to form a generally inverted hollow cone having, however, an open orifice 44 formed by terminating the walls above the point at which the walls would meet, that is, above what would be the apex of the cone. Downwardly and outwardly extending deflector walls 45 disposed below orifice 44 form an upright, generally conical deflector 51 having an apex 46 centered below the orifice and having means, such as legs 47, mounting the deflector to the duct walls. The deflector is provided with outer peripheral openings 48 between legs 47 at the lower edge of the deflector walls, and a plurality of apertures 49 are provided through the deflector walls. The upper and inner or apex portion 50 of the deflector which lies directly below orifice 44 is, however, solid and unbroken whereby water falling through orifice 44 cannot fall directly through deflector 51 but meets portion 50 thereof. A plurality of openings or orifices 54 are similarly provided through the deflecting walls 41, but none of openings 54, preferably, extends to the duct wall 43, and, accordingly, water running down duct wall portion 55 immediately above the deflecting walls is deflected inwardly away from the duct walls before it can pass through the deflecting walls.

Water, or other scrubbing liquid, is supplied in this embodiment much in the manner of FIG. 1, trough 57 being arranged in the duct to have an inner overflow edge 58 positioned to deliver water to run down the duct wall portion 55 and out onto deflecting walls 41, and to have an outer edge 59 outside of the duct disposed at a height or elevation greater than that of edge 58. The lower edge portion 60 of the upper duct wall 61 enters the trough and extends below the level of edge 58 to form a seal. Debris 62 may collect in the trough for ready external removal.

The openings or orifices 44, 54, 49 and 48 may be of circular, square, rectangular or other desired shape. It will also be understood that the walls 41 and 45 may form configurations other than conical, it being necessary only that the deflecting walls 41 extend inwardly and downwardly from their attachment at 42 to the duct walls and that deflector walls 45 extend downwardly and outwardly. The configuration formed by the walls, accordingly, may be generally pyramidal or wedge shaped instead of conical.

The operation of the scrubber of FIG. 2 is generally similar to that of the scrubber of FIG. 1, except that in that of FIG. 2, the water flowing down the wall portion 55 is deflected by the walls 41 to flow in an inward and downward direction. As so directed, the water is projected across the individual orifices 54 and is also projected into the central orifice 44. Through each of these orifices the gas to be scrubbed is passing at high velocity in an upward direction and a gargling action occurs at each causing droplets to be entrained and to rise into the upper duct portion 64 with the gas. These droplets tend, as before, to fall out of the gas toward the duct walls and thus to add to the liquid falling on wall portion 55.

The liquid which is not entrained passes downwardly through one or another of openings 54 and 44 and flows down deflecting walls 45 and into openings 49 thereof, being again subject to entrainment with the upwardly flowing gas. Some of the water will flow down walls 45 to the lower edges thereof and into openings 48, creating a gargling action there. Excess liquid falls into sump chamber 2. Droplets entrained above walls 45 tend to fall out above these walls, usually toward the side walls 65 of the duct between the conical wall elements 41 and 51, and such liquid may be entrained again or may fall into the sump.

Any large lumps of debris which enter the duct may fall freely through orifice 44 and thence through any one of openings 48 into the sump.

It is desirable that the aggregate area of all openings, including openings 48 and 49, of the deflecting arrangement 51 should be at least substantially as great as the aggregate area of all openings, including openings 44 and 54, of the deflector 41, whereby the gas velocity through each opening is substantially greater than the velocity in other parts of the duct.

Figure 3:
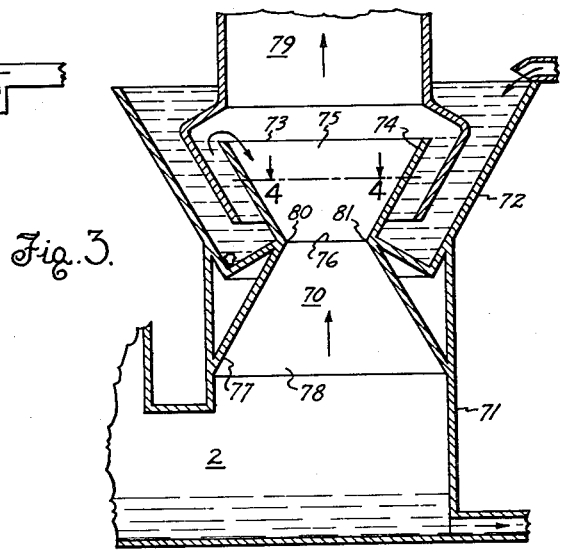
FIG. 3 is a sectional side elevation of a scrubber showing a second modified construction.
Figure 4:
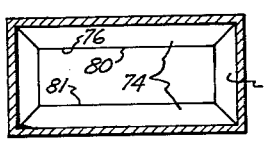
FIG. 4 is a sectional plan view of a portion of the scrubber of FIG. 3 taken along line 4—4 thereof.

As shown in FIGS. 3 and 4, the scrubber may comprise a vertical venturi or nozzle element 70 disposed within vertical duct 71 through which the gases to be scrubbed rise in opposition to scrubbing liquid supplied from a trough 72 surrounding the gas stream and positioned to supply the liquid over overflow lip 73 onto inwardly and downwardly directed walls 74 and 75. The walls 74 and 75 define generally the shape of an inverted hollow wedge truncated at a throat or orifice 76 at which these walls are joined to outwardly and downwardly extending walls 77 and 78 to complete a venturi 70 of rectangular cross section. In conformance with the venturi shape, the duct 79 formed by walls 71 is preferably rectangular in cross section. It will be apparent that the venturi and duct may be circular, if desired, as suggested for the orifice and duct as shown in FIG. 1.

Water, or other scrubbing liquid, coursing down the walls 74, 75 is projected into the stream of gas flowing upwardly at high velocity through throat 76 at which a gargling action occurs. The width dimension of the throat, as measured between the lower edges 80 and 81 of the respective side walls 74 is sufficiently small to permit the water from each side wall to be projected at least substantially to the center of the throat, whereby all parts of the gas stream are contacted by the water. A relatively much larger throat area is permissible if the throat is rectangular than if it is circular, accordingly, since, even for a long rectangular throat, or long oval throat, water may reach the center of the throat as effectively as in a circular throat of a diameter equal to the width of the elongated throat.

In operation, the arrangement of FIGS. 3 and 4 provides that the liquid overflowing trough lip or edge 73 courses down walls 74, 75 and meets and is gargled by the gas flowing upwardly through throat 76, the liquid droplets rising with the stream and being thrown out, as the gas loses velocity, toward the duct walls, there to add to the liquid supplied by the trough. Excess liquid flowing down to the throat which is not picked up by the gas stream tends in part to cling to the walls 77 and 78 and constantly washes these walls. If the incoming gas dries a small area of wall 77 or 78, a few moments later, because of the gargling action which throws water back and forth, a substantial volume of water will reach that area, washing it thoroughly. There is no area, within the venturi or above or below the venturi, or even within sump chamber 2, accordingly, at which a wet-dry line can exist except momentarily. The excess liquid is thrown back and forth by the gargling action and sloshes down the walls and into the chamber, splashing unevenly into the liquid in the sump, this being characteristic of the invention, and, of course, of each embodiment shown herein.

Figure 5:
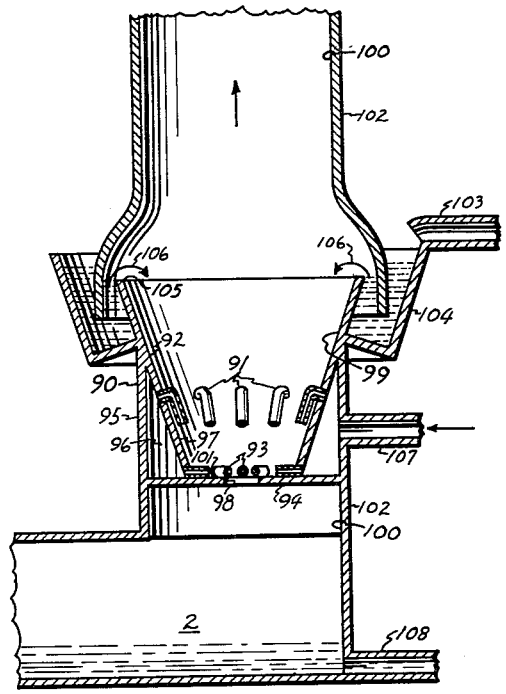
FIG. 5 is a sectional side elevation of a scrubber showing a modified construction wherein nozzles are embodied therein, the basic construction and operation of the scrubber being similar to that shown in FIG. 1.

The gas scrubbing nuit 90 shown in FIG. 5 is of generally the same design and construction as the gas scrubbing unit shown in FIG. 1 but with certain modifications. The unit 90 is modified primarily in that a plurality of spaced nozzles 91 are arranged and disposed along the downwardly converging duct walls 92 and a plurality of nozzles 93 are spaced one from the other adjacent to the orifice plate 94. Furthermore, the outer duct walls 95, converging duct walls 92 and orifice plate 94 define a chamber 96, such as a steam chamber, which is supplied with a heating fluid, such as steam, by means of pipe 107 which is connected to a suitable source of heating fluid external of the unit. This arrangement of nozzles and orifices is designed to permit the use of a larger orifice area and accordingly the use of greater volumes of gas to be scrubbed by projecting the downward flowing scrubbing liquids into more intimate contact with the gases at the throat.

Nozzles 91 along the face 97 of downwardly converging walls 92 project downwardly, generally toward the plate orifice 98, and communicate through the walls 92 to steam chamber 96 from which they are supplied with suitable heating fluids under pressure, the nozzles being so disposed that the heating fluid passing therefrom will give impetus and velocity to the liquid as it courses downwardly along the face 97 of walls 92 at the periphery of the diverging gas portion 99 of the confined upwardly extending gas zone 100.

Nozzles 93 on the other hand project radially inwardly along the upper face 101 of orifice plate 94 and communicate through duct walls 92 to the chamber 96 from which they are supplied with steam or other heating fluid. Nozzles 93 are so disposed as to accelerate the liquid which has been guided to the plate 94 by the walls 92 in a direction leading toward the center of the upwardly moving stream of high velocity gases in the orifice portion 98 of the confined gas zone 100.

In the operation of the scrubbing unit 90, gas is continuously forced upwardly through the duct 102 which defines an upwardly extending confined gaseous zone 100. The path of the gas, in its upward movement, is constricted at orifice 98, and, therefore, the upward velocity of the gas is substantially increased at the orifice. Thereafter, the gas passes from the orifice portion 98 of zone 100 and gradually, as compared to the rapid velocity increase in the orifice 98, decreases in velocity in the upwardly diverging portion 99 of zone 100, ultimately passing out at the top of the confined gas zone 100.

The liquid for washing the gases is passed into the confined zone 100 above the orifice or zone of maximum gas velocity. As seen in FIG. 5, the liquid is supplied by means of pipe 103 and trough 104, from whence the liquid courses over the inner edge 105 of trough 104 at the peripheral sides of the gaseous zone 100 as indicated by arrow 106. The liquid so supplied passes downward along the face 97 of walls 92 which guides the liquid in its downward path along the peripheral side of the diverging portion 99 of gas zone 100. Simultaneously, chamber 96 is being supplied with a hot fluid, such as steam, through supply pipe 107, which issues forth from nozzles 91 and 93 at high velocities. The liquid which is passing downwardly along the face 97 of walls 92 is heated by the wall elements and by the jets of steam issuing from the nozzles 91 therealong. The walls 92, of course, are heated through direct contact with the steam in chamber 96. The jets of steam issuing from nozzles 91 not only heat the liquid passing over the face 97 below said nozzles but accelerate the downward motion thereof. This acceleration causes the liquid to impinge upon the plate 94 and forces parts of the liquid into the jet streams of steam issuing from nozzles 93 adjacent to plate 94. Nozzles 93 function in a manner similar to nozzles 91 except that they accelerate the liquid in a direction which leads directly into the path of the upwardly moving gas passing through orifice zone portion 98 and into the diverging zone portion 99, thereby forcing the liquid and upward moving gases to intimately and thoroughly mix. Because of this intimate mixing greater quantities of liquids are entrained by the upwardly moving gases and a more thorough scrubbing thereof is accomplished.

Thus the jets of gases such as steam, air, or of other fluids such as scrubbing liquid make-up or recycle passing from the orifice nozzles 91 and 93 aid in distributing the scrubbing liquid in the path of the high velocity gases passing upwardly from the orifice zone portion 99. In this way greater turbulence and better distribution of and contact between the liquid and gases is realized, giving a more thorough gas scrubbing action which permits the use of greater central orifice areas. Excess amounts of liquid beyond that entrained by the gas falls through the orifice zone and ultimately fall into sump 2 from which they may be withdrawn through pipe 108.

The gargling action secured in the embodiment illustrated in FIG. 5 is aided by the use of the nozzles and orifices in the sense that the scrubbing liquid is more firmly projected into the upwardly passing gases to be scrubbed. As such better contact is made between the liquid and gases and a higher proportion of the liquid is projected upwardly with the gas stream in the form of slugs which become dispersed to cleanse the gases. Excessive amounts of scrubbing liquid still continue to fall through orifice 98 and are projected erratically about beneath the orifice plate 94 by the gases converging for passage through the orifice. The liquid is projected by the turbulent gases beneath the orifice plate 94 along the walls of the duct and effectively wash such walls and prevent solids from building up at a wet-dry line as heretofore explained.

In many chemical process installations, it is necessary to use a plant liquid which is of relatively higher viscosity than desirable for use as a scrubbing liquid with most gas scrubbing apparatus, the higher viscosities making it difficult to secure adequate turbulence and mixing of the liquid and gaseous phases. By heating the liquids through the wall elements 92 and by means of the issuing streams of steam or other fluids the higher viscosity liquids are heated in their passage over the face 97 of walls 92 and accordingly their viscosity may be decreased to within a suitable range for adequate scrubbing operations. For example, my work has shown that black liquor of about 65% total solids from the digestion of wood with sulfate liquor has a viscosity of about 1,800 centipoises at 160° F. At 190° F. the viscosity is 500 centipoises and at 220° F. is about 150 centipoises. Since the black liquor is used in a kraft recovery furnace to scrub gases that may run from 400° F. dry bulb temperature with approximately 170° F. wet bulb temperature evaporation tends to cool the recycled liquor to the vicinity of the wet bulb temperature. At this temperature it becomes very viscous and does not flow and fill the throat of the scrubbing unit as readily as it does when the temperature is raised by steam injection and the viscosity lowered as consequence thereof.

Figure 6:
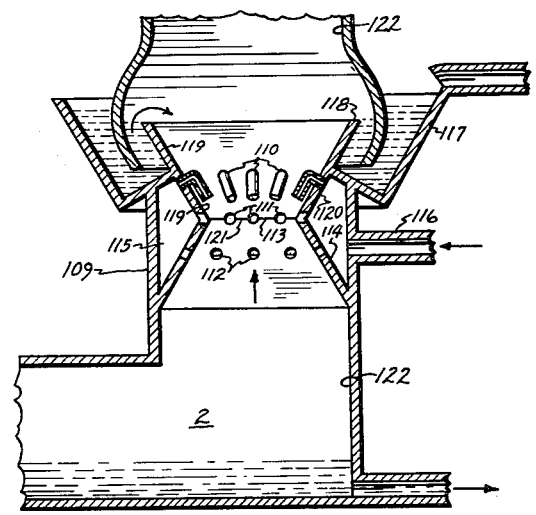
FIG. 6 is a sectional side elevation of a scrubber having a basic construction and operation similar to that shown in FIG. 3, the construction and operation being modified through the addition of nozzle and orifices respectively located adjacent to and at the throat of the venturi section thereof, and a steam jacket section to supply said nozzles and orifices with a heating fluid.

The gas scrubbing unit 109 shown in FIG. 6 is of similar construction and operation as that unit shown in FIG. 2 being modified however to provide a plurality of spaced nozzles 110 above the throat 113 and a plurality of orifices 111 and 112, respectively located at the throat 113 and below the throat along upwardly converging walls 114. Steam chamber 115 and pipe 116 to supply the chamber 115 with an adequate supply of heating fluid are also provided in the modified embodiment.

In the operation of scrubbing unit 109, the liquid is passed into the unit by means of trough 117 the liquid overflowing the weir or inner edge 118 from which the scrubbing liquids course downwardly and inwardly along downwardly converging walls 119. Simultaneously, steam or other like heating fluid, such as hot make-up liquid, is passed through pipe 116 into chamber 115 from which the heating fluid issues through nozzles 110, and orifices 111 and 112. The walls 114 and 119 forming the venturi section 120 of the scrubber 109 are heated through contact with the heating fluid in chamber 115 and aid the hot fluid streams issuing from the respective orifices and jet nozzles in heating the liquid passing therealong. The hot fluid which passes through spaced throat orifices 111 in orifice portion 121 of the confined zone 122 cause the liquids which have passed downward along walls 119 to more thoroughly mix with the upward stream of high velocity gases passing through the orifice or throat 113 by projecting the liquid centrally thereinto. The hot fluids issuing from nozzles 110 function in a manner generally similar to the action attributed to the fluids passing from nozzles 91 in FIG. 5, the principal difference being that the high velocity fluid passing through nozzles 110 in FIG. 6 project the downwardly passing liquids directly into the path of the upwardly passing high velocity gases in the central orifice or throat 113 whereas the hot fluids issuing from nozzles 91 in FIG. 5 cause the liquids to impinge upon orifice plate 94 prior to being deflected thereby into the upwardly moving gases in orifice zone 98. In the unit shown in FIG. 6 the hot fluids which pass from orifices 112 aid in redistributing the liquid which has passed through the throat 113. Thus the fluids issuing from orifices 112 project the falling liquid outwardly from walls 114 and centrally into the path of the upwardly passing gases.

Figure 7:
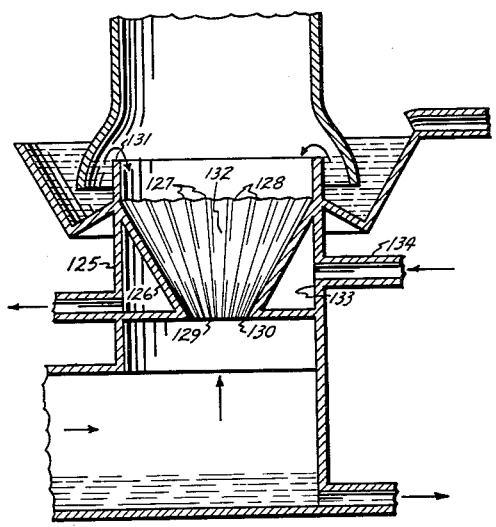
FIG. 7 is a sectional side elevation of a scrubber having channeled courses along the downwardly converging wall portion and an indirect heating construction for heating the liquid as it passes therealong.

The embodiment of a scrubbing unit 125 shown in FIG. 7 is designed and operated in a manner generally similar to the unit shown in FIG. 1, the exceptions principally residing in the use of an indirect heating system for heating the downwardly converging walls 126 and thereby the downward coursing liquid passing thereover, and in the further use of a converging wall 126 which is fluted and has upstanding spaced rib portions defining spaced channels or grooved portions 128 extending downwardly to orifice or throat 129. Another exception lies in eliminating the inwardly extending orifice plate so that the inner edges 130 of the walls 126 form the orifice 129 or throat. The fluted construction of the walls 126 shown in FIG. 7 causes the liquids overflowing weir 131 to course downwardly in channeled paths leading along walls 126 into the stream of upwardly passing gases through the central orifice 129. By channeling the liquids, as by means of the ribs 127, more even distribution of the liquid about the orifice 129 is secured. The channeled liquid streams also appear to be projected farther out into the path of the high velocity upwardly moving gases at the central orifice 129. For heating the liquid in channels 128, a suitable liquid heat transfer medium such as that sold under the trademark "Dowtherm," hot oil, steam or other hot fluids may be passed into chamber 133 by means of pipe 134, the drips or cooled fluid flowing out of chamber 133 as by means of pipe 135. It will be understood that the hot fluids in chamber 133 heat walls 126 and accordingly the liquid on the walls tends to be reduced in viscosity and therefore more readily to course downwardly thereover.

FIGS. 8 and 9 show a modified version of a downwardly converging wall section 136 as associated with duct wall 137 and orifice plate 138. In this version spaced ribs 139 diverge from top 140 to bottom 141 of wall 136, nozzles 142 being provided within the channels 143 between said ribs 139 and projecting downwardly. The nozzles 142 communicate with chamber 144 through wall 136 whereby steam supplied to chamber 144 by pipe 145 will issue projectingly downward along wall 136 within respective channels 143 toward orifice plate 138. Orifice plate 138 has connecting channels 146 defined between upstanding rib portions 147 thereof, the channels 146 communicating with the inner orifice forming edge 148 of plate 138. It will be understood in the case of the wall 136 shown in FIGS. 8 and 9 that the wall illustrated forms one side of a rectangular downwardly converging wall portion similar to that shown in FIG. 4. Orifices 149 formed in plate 138 are directed along respective channels 146 and function in a manner similar to the nozzles 93 of FIG. 5.

In a gas scrubber utilizing the construction shown in FIGS. 8 and 9, the washing liquid would pass by gravity downwardly along the upper face 150 of wall 136 and be divided by ribs 139 into separate channeled courses therealong as in channels 143. The force of the steam or other fluid issuing from nozzles 142 gives added impetus to the downward moving liquid in its channel courses, projecting it therealong and impinging it against orifice plate 138 in channels 146 and adjacent to orifices 149. The steam or other heating fluid issuing from orifices 149 will direct the liquid along channels 148 and thence into the orifice region indicated by arrow 151 where it is deflected upwardly and is broken up by the high velocity upwardly flowing gases to be scrubbed.

Utilization of channeled courses in conjunction with nozzles and orifices projecting fluids therefrom has been found to enable projection of the liquid further into the center of the orifice through which the gases to be scrubbed are passed upwardly and to thereby permit the use of wider throat areas. The steam or liquor supplying nozzles and orifices can be disposed at various different locations, obvious to those skilled in the art in view of the disclosure herein, to spread or disperse the scrubbing liquid into the upwardly moving stream of gases to be scrubbed.

This application is a continuation-in-part of my co-pending application Serial No. 741,928, filed June 13, 1958, entitled Gas Scrubbing Method and Apparatus, now abandoned.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. A gas scrubber comprising a vertical gas conduit having walls, means to flow gases to be scrubbed upwardly through said conduit, throat forming means extending inwardly from the walls of the conduit and presenting an upwardly facing surface for restricting the upward flow of gases in said conduit, means for flowing scrubbing liquid onto said surface comprising a liquid supply conduit having an opening into said gas conduit, said liquid supply conduit being disposed outwardly of said throat adjacent the conduit walls and above said surface, a plurality of spaced nozzles along said upwardly facing surface projecting inwardly of said conduit walls, and means for passing a heating fluid through said nozzles.

2. A gas scrubber comprising a vertical gas conduit having walls, means to flow gases to be scrubbed upwardly through said conduit, throat forming means extending inwardly from the walls of the conduit and presenting an upwardly facing surface for restricting the upward flow of gases in said conduit, means for flowing scrubbing liquid onto said surface comprising a liquid supply conduit having an opening into said gas conduit, said liquid supply conduit being disposed outwardly of said throat adjacent the conduit walls and above said surface, said throat forming means having a plurality of upstanding spaced ribs defining channels extending inwardly from the walls of said conduit along said upwardly facing surface, a plurality of spaced respective nozzles disposed along said upwardly facing surface directed into the respective channels and projecting inwardly of said conduit walls, and means for passing a heating fluid through said nozzles.

3. A gas scrubber comprising a vertical duct rectangular in cross section, scrubbing liquid deflecting walls extending inwardly from the walls of the duct forming a restrictive orifice conforming generally in shape to said duct cross section and located substantially centrally between the duct walls, means to flow scrubbing liquid along said deflecting walls and thence into said orifice in excess volume, means to force gases to be scrubbed upwardly in said duct and through said orifice, a plurality of spaced nozzles along said deflecting walls projecting inwardly of said duct walls, and means for passing a heating fluid through said nozzles.

4. In a gas scrubber, a vertical gas venturi having a throat, said venturi being formed with entering walls below and converging upwardly toward said throat and leaving walls above and diverging upwardly from said throat, means to force gas upwardly through said venturi, means to flow an excess volume of scrubbing liquid down said leaving walls toward and into said throat, a plurality of spaced nozzles along said leaving walls projecting inwardly toward said throat, and means for passing a heating fluid through said nozzles.

5. A scrubber for hot dust laden gases comprising a vertical gas conduit having a wall, a sump connected to the bottom of said conduit, means to flow a stream of gases to be scrubbed upwardly through said conduit, orifice means within said conduit above said sump forming an orifice for the passage of the gases therethrough and for restricting the upward flow of the gases and increasing the velocity thereof thereat, said orifice means including wall means surrounding and converging downwardly toward said orifice for deflecting scrubbing liquid into the center of said orifice, and scrubbing liquid delivery means opening into said conduit adjacent said conduit wall for delivering scrubbing liquid through the conduit wall and to the surrounding wall means about said orifice in amounts in excess of that entrainable by gases flowing upwardly through said orifice, the opening of said liquid delivery means being above said wall means and surroundingly disposed above and about said orifice.

6. A scrubber for hot dust laden gases in accord with claim 5 further comprising means adjacent said wall means for heating said wall means.

7. A scrubber for hot dust laden gases in accord with claim 5 further comprising channel defining spaced ribs on said wall means and extending inwardly from the duct wall toward said orifice.

8. In a scrubber for hot dust laden gases, a vertical conduit, means forming an orifice in said conduit, said conduit including a wall diverging upwardly from said means, means to force gas upwardly through said orifice, means to flow an excess volume of scrubbing liquid down said diverging wall toward and into said orifice, said wall having a plurality of spaced upstanding ribs which define channels therebetween and which extend inwardly toward said orifice, a plurality of nozzles respectively disposed in said channels and projecting inwardly toward said orifice and means for passing a heating fluid through said nozzles.

References Cited in the file of this patent

UNITED STATES PATENTS

| | | |
|---|---|---|
| 130,656 | Payne et al. | Aug. 20, 1872 |
| 1,629,210 | Feroldi | May 17, 1927 |
| 1,941,734 | Black | Jan. 2, 1934 |
| 1,969,986 | McGrail | Aug. 14, 1934 |
| 2,039,540 | Seaver et al. | May 5, 1936 |
| 2,234,735 | Lambert et al. | Mar. 11, 1941 |
| 2,380,065 | Newcomb | July 10, 1945 |
| 2,457,686 | Kopita | Dec. 28, 1948 |
| 2,604,185 | Johnstone et al. | July 22, 1952 |
| 2,716,024 | Dice | Aug. 23, 1955 |
| 2,719,707 | Rector | Oct. 4, 1955 |
| 2,810,562 | Eld et al. | Oct. 22, 1957 |
| 2,828,951 | De la Fourniere | Apr. 1, 1958 |
| 2,871,973 | Roujob | Feb. 3, 1959 |
| 2,906,511 | Umbricht et al. | Sept. 29, 1959 |

FOREIGN PATENTS

| | | |
|---|---|---|
| 135,832 | Germany | Nov. 4, 1902 |
| 247,657 | Great Britain | Feb. 19, 1926 |
| 326,964 | Germany | Nov. 2, 1920 |
| 809,378 | Great Britain | Feb. 25, 1959 |